United States Patent
Finley, Jr. et al.

(10) Patent No.: US 7,471,684 B2
(45) Date of Patent: Dec. 30, 2008

(54) PREVENTING ASYNCHRONOUS ARP CACHE POISONING OF MULTIPLE HOSTS

(75) Inventors: Paul Bernell Finley, Jr., Austin, TX (US); Tommy Lucas McLane, Hutto, TX (US); Eduardo Lazaro Reyes, Austin, TX (US)

(73) Assignee: International Machines Corporation, Armonk, NY (US)

( * ) Notice: Subject to any disclaimer, the term of this patent is extended or adjusted under 35 U.S.C. 154(b) by 756 days.

(21) Appl. No.: 10/970,301

(22) Filed: Oct. 21, 2004

(65) Prior Publication Data

US 2006/0088037 A1    Apr. 27, 2006

(51) Int. Cl.
*H04L 12/28* (2006.01)
(52) U.S. Cl. .................................. 370/392; 370/401
(58) Field of Classification Search .................. None
See application file for complete search history.

(56) References Cited

U.S. PATENT DOCUMENTS

| | | | | |
|---|---|---|---|---|
| 6,888,834 B1 * | 5/2005 | Wood et al. | ............. | 370/395.41 |
| 6,925,079 B2 * | 8/2005 | Matsukawa | .................. | 370/389 |
| 7,124,197 B2 * | 10/2006 | Ocepek et al. | ............... | 709/232 |
| 7,134,012 B2 * | 11/2006 | Doyle et al. | ................. | 713/151 |
| 7,234,163 B1 * | 6/2007 | Rayes et al. | ................... | 726/22 |
| 2004/0083286 A1 * | 4/2004 | Holden et al. | ............... | 709/225 |

OTHER PUBLICATIONS

D. Bruschi, A. Ornaghi, E. Rosti, "S-ARP: A Secure Address Resolution Protocol" Dipartimento di Informatica e Communicazione, Italian Department of Education and Research F.I.R.S.T. project.
"Securing Neghbor Discovery," www.ietf.org, May 25, 2004.
P. Nikander, et al., IPv6 Neighbor Discovery (AND) Trust Models and Threats, Internet Society, www.ietf.org/rfc/rfc3756.txt. May 2004.
U.S. Patent Application entitled, "Method to Identify Transactions and Manage the Capacity to Support the Transaction,".
Manwani, Silky, "ARP Cache Poisoning Detection and Prevention," San Jose State University, Dec. 2003.

\* cited by examiner

*Primary Examiner*—Chau Nguyen
*Assistant Examiner*—Eunsook Choi
(74) *Attorney, Agent, or Firm*—Dillon & Yudell LLP

(57) ABSTRACT

A method and system for preventing address resolution protocol (ARP) cache poisoning in a network system with multiple hosts. Multiple hosts representing and/or located in separate local area networks (LANS) are tapped (via a shared agreement) to utilize a trusted ARP cache for each LAN represented. Whenever a new ARP response is detected in one network, a request for validation is sent to a separate host in a different network. The separate host initiates a verification process for the ARP, which involves checking whether duplication of one of the IP address or MAC address of the ARP response exists within the address pairings in the ARP cache. If the ARP response is not validated, then the trusted ARP cache is not updated and the system administrator is notified of the failed attempt.

7 Claims, 4 Drawing Sheets

PREVENTING ASYNCHRONOUS ARP CACHE POISONING OF MULTIPLE HOSTS

BACKGROUND OF THE INVENTION

1. Technical Field

The present invention relates generally to local area networks (LAN), and particularly to security on LANs. More specifically, the present invention relates to a method and system for preventing address resolution protocol (ARP) cache poisoning on a LAN.

2. Description of the Related Art

With the expanding utilization of electronic networks to support personal/secure data transactions and data communications, enhanced network security is a commodity desired by those designing/configuring, setting up, managing, and using electronic networks. Conventional local area networks (LANs), for example, now include servers and client systems that only allow users of the client systems to access and interact with the information stored on the network after the user has been authenticated by the access device (e.g., client system).

One of the more common addressing protocols utilized within conventional LANs is the address resolution protocol (ARP). ARP and the above and other functionality attributable therewith are well known in the art. The ARP protocol is utilized to "map" IP addresses to MAC addresses. When a host system receives an ARP request, the router adds an entry to its ARP cache that maps the IP address to the MAC address of the device. This is later utilized to route/forward data packets received by the router addressed to the IP address to the correct device (identified by the MAC address). The ARP request broadcasted to all nodes on the LAN and instructs the nodes whose ARP cache contains this IP address to change the MAC address associated with the IP address in the cache to the MAC address of the device.

The received ARP request includes the MAC and IP addresses of the device that initiated the ARP request as well as the IP address of the stack. An ARP response is generated by a receiving system, including the MAC address of the stack.

ARP makes use of broadcasts and does not have any form of authentication process. Because of these characteristics, ARP is particularly vulnerable to attack by unauthorized users. One type of attack commonly made using ARP involves the use of spoofed ARP responses. With spoofed ARP responses, an attacker is able to take the place of another device in the LAN for sending and receiving packets. Also, the attacker may implement what is referred to in the art as a "man-in-the middle" attack, which allows the attacker to intercept all packets from a source and replay the packets.

The above described attacks based on inherent limitations in the protocol become a problem for security within LANs and makes even secure LANs susceptible to security attacks from the inside. For example, the practice of ARP cache poisoning is a well known attempt at breaching network security. The attacker "poisons" the ARP cache of unprotected systems by sending fake ARP responses that are automatically placed in the ARP cache of the victim device (or host). Once the attacker has successfully corrupted the ARP cache of a victim host, then attacker is then able to perform a "man-in-the-middle" attack to read/detect private network traffic (e.g. passwords, etc.). While this particular attack must be performed by someone on the LAN, the attack is still considered a security breach.

Several different solutions to prevent this man-in-the-middle attack currently exist. Among these solutions, a first solution involves hard coding permanent ARP entries in an ARP lookup table. These entries cannot be overwritten by incoming ARP responses. The main drawback to this solution is that since the ARP entries are hard-coded by an administrator, the entries must be maintained whenever any information changes within the LAN (e.g. a new hosts added, hostname changes, additional Ethernet cards, etc.). This administrative maintenance requires monitoring and is, for that and other reasons, in-efficient.

A second solution involves writing a program that keeps track of all outgoing ARP requests and all incoming ARP responses, and then verifies that each response has a corresponding request. This solution is described at world-wide-web (www) site cs.sjsu.edu/faculty/stamp/students/Silky_report.pdf. With this solution, whenever a new response comes in (e.g. from an attacker), if the response is determined to not be warranted, the response is ignored. Also, the sending host's IP address can be logged (detected) for security purposes. This solution requires extra overhead for all ARP traffic. Every host on the network must run this program in order to protect its own cache. Thus, much duplication of effort is required.

The present invention recognizes that it would be desirable to implement a solution that substantially eliminates the aforementioned network attacks by ARP cache poisoning without exhibiting the limitations of the above two solutions.

SUMMARY OF THE INVENTION

Disclosed is a method and system for preventing address resolution protocol (ARP) cache poisoning in a network system with multiple hosts. Multiple hosts representing and/or located in separate local area networks (LANs) are configured (via a shared agreement encoded in each host) to utilize a trusted ARP cache for each LAN represented. Whenever a new ARP response is detected in a first LAN, a request for validation is sent to a second host in a second LAN. The second host initiates a verification process for the IP and MAC addresses within the ARP response. If the addresses within the ARP response are validated (as being new), then the trusted ARP cache is updated to reflect the new address information taken from the ARP response.

However, if any one of a number of pre-defined conflicts occurs regarding the address information/data within the ARP response (e.g. duplication of only one of the MAC address and the IP address in the response), then the trusted ARP cache is not updated with the information from the ARP response. In one embodiment, a notification of the conflict is sent to the network administrator. Accordingly, validation of the ARP responses only occur when needed and a single host is able to protect an entire LAN, which greatly reduces the duplication of effort in maintenance and protection of the network.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for preventing address resolution protocol (ARP) cache poisoning in a network system with multiple hosts. A trusted ARP cache is provided and utilized by a respective host representing one of multiple local area networks (LANs) that are connected via gateways to form an electronic network system. Whenever a new ARP response is detected in a first one of the LANs, a request for validation of the IP and MAC addresses therein is sent to at least a second host in a second LAN. The second host that receives the request initiates an authentication process for the ARP response (addresses). If the ARP response is authenticated, then the trusted ARP cache(s) of the multiple LANs are updated to reflect the new address information taken from the ARP response. However, if any one of a number of predefined conflicts regarding the addresses within the ARP response occur (e.g. an inconsistent pairing of MAC address and IP address, where a single one of the addresses is found in a different pairing within the ARP cache), then the ARP cache is not updated with the information and a notification of the conflict is sent to the network administrator.

Figure 1:
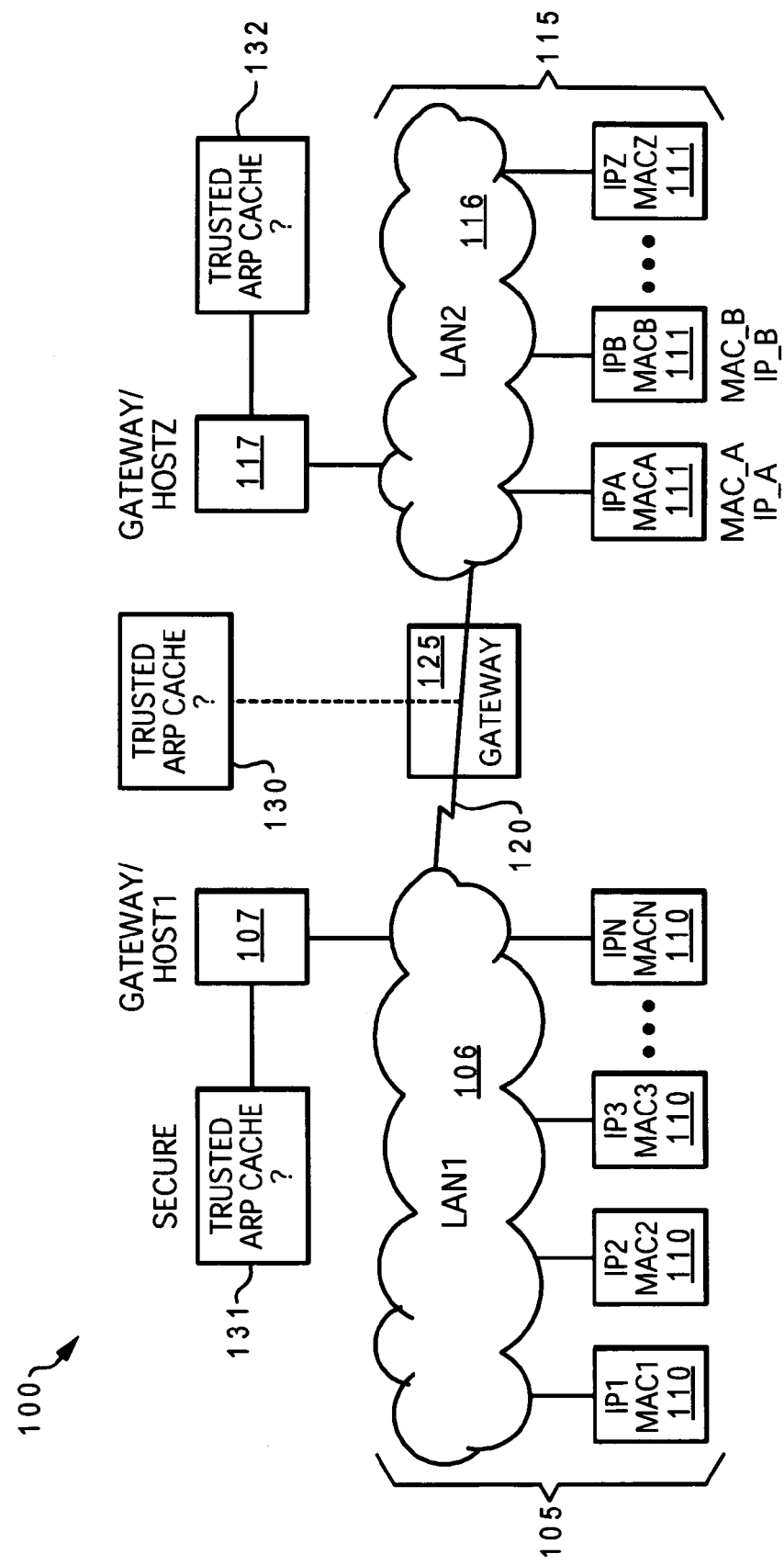
FIG. 1 is a block diagram illustrating a network with two connected local area networks (LANs) with localized hosts and trusted ARP tables within which the various features of the invention are implemented according to one embodiment of the invention.

With reference now to the figures, and in particular to FIG. 1, there is illustrated an exemplary network system comprised of two interconnected LANs. Notably, while the exemplary embodiment is described with two LANs, the invention is equally applicable to larger network systems with multiple interconnected LANs. A key component of this system is that the various LANs each maintain a separate host computer (or gateway) and are each pre-configured to reference a single secure/trusted ARP cache within their respective LAN.

As illustrated, each of the exemplary LANs 105, 115 includes several computers 110, 111 communicatively coupled to one another over a network structure/backbone 106, 116, represented by respective clouds. Network backbone 106, 116 may be designed using one of several known structures including Ethernet, 1394 or 802.11b, for example. Also, network backbone 106, 116 may include many well-known components, such as routers, gateways, hubs, etc. and may allow computers 110, 111 to communicate via wired and/or wireless media.

Computers 110, 111 may be implemented as any suitable computing device such as personal computers, servers, handheld devices, printers, switches, routers, bridges, repeaters or the like. Computers 110, 111 are illustrated having an IP address and associated MAC address, unique for each device. Thus computers 110 of LAN 105 are illustrated with IP addresses IP1 . . . IPn and MAC addresses MAC1 . . . MACn, while computers 111 of LAN 115 are illustrated with IP addresses IPa . . . IPz and MAC addresses MACa . . . MACz. For each LAN 105, 115, one of the computers is selected to operate as host (or host computer or server) 107, 117. Hosts 107, 117 may be network servers that perform administrative network tasks and manage the other components on the LAN and the network itself In the illustrative embodiment, hosts 107, 117 are also the connecting points/devices between LANs 105, 115.

Hosts 107, 117 are computer systems, which may be configured similarly to the other computers 110, 111, but are provided with additional hardware and functional software for enabling the various features for managing the networks including those features provided by the present invention. According to one embodiment, hosts 107, 117 serve as gateways for their respective LANS 105, 115. Associated with each host 107, 117 is a trusted ARP cache (referred to hereinafter by the acronym TARPC) 131, 132, which enables the ARP response authentication features of the invention to be implemented. The functionality and use of TARPC 131, 132 will be described in details below.

In an alternate embodiment, separate gateways 125 are provided on the interconnect 120 between LANs 105, 115. In this alternate configuration, a single trusted cache 130 is connected to the gateway 125 and is utilized by the entire network of interconnected LANs 106, 116. Communication exists between the gateways, which maintain the trusted ARP cache whenever a new ARP response occurs. These gateways (rather than the host systems, in this implementation) determine the validity of the ARP response by comparing the ARP response with the trusted ARP cache of the LANs 107, 117.

Figure 2:
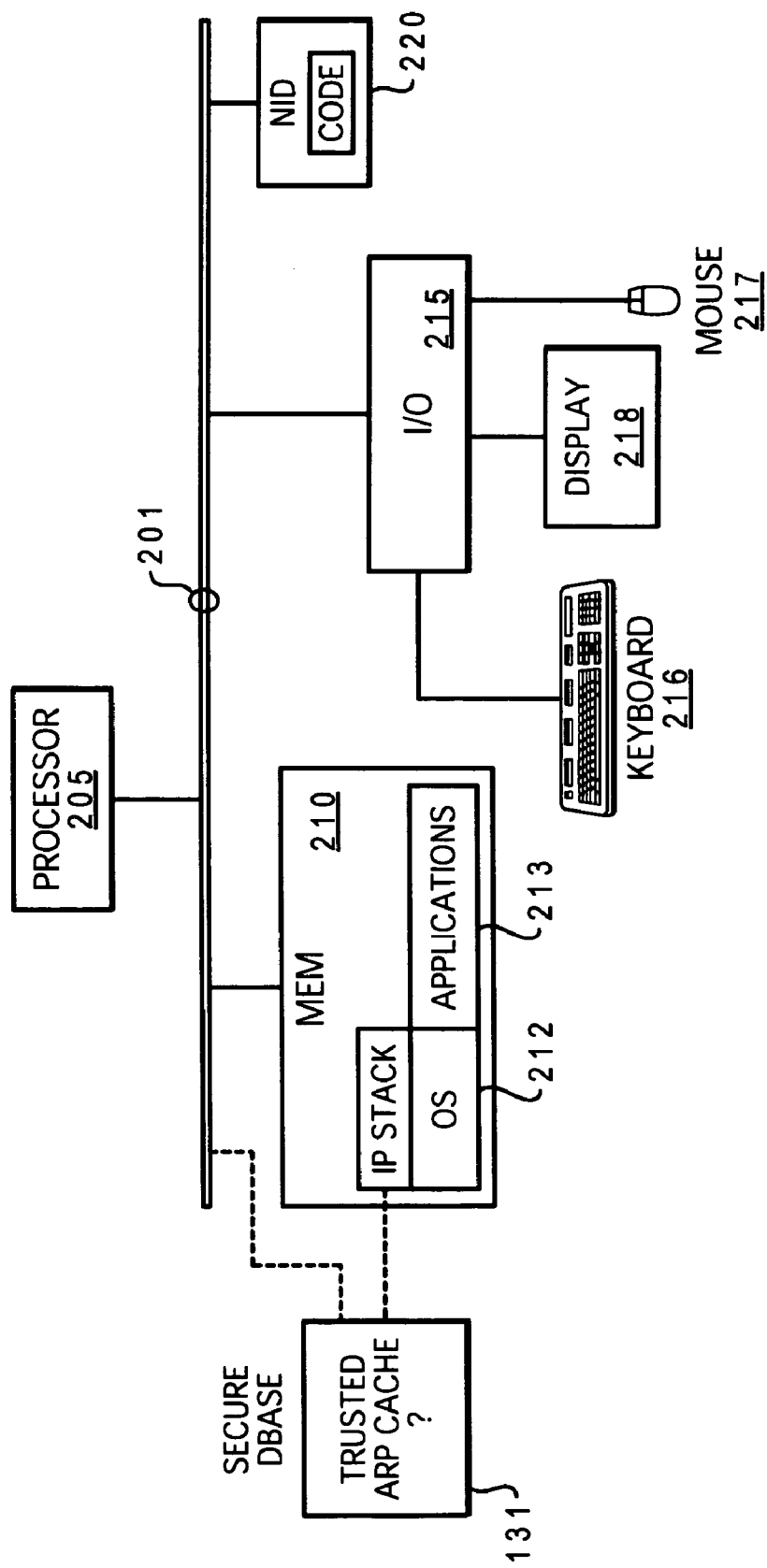
FIG. 2 is a block diagram illustrating basic components of a data processing system utilized as a host within the LANs of FIG. 1 according to one embodiment of the invention.

FIG. 2 provides a block diagram illustration of an exemplary host (also an exemplary computer system), interchangeably referred to herein as host system or host device. In its most basic configuration, host system 107, 117 is a computer system that includes at least one processor 205 and memory 210, and input/output (I/O) device controller 215. Coupled to I/O device controller 215 are various I/O devices, of which keyboard 216 and mouse 217 are illustrated as input devices and display 218 is illustrated as an output device.

Host system 107, 117 also includes a network interface device (NID) 220 by which host system 107, 117 connects to network 100 (with internal LAN connections as well as external LAN connections, as configured). Network interface device 220 thus enables host system 107, 117 to communicate with other systems on the general network 100. A communication medium on the host system 107, 117 enables for completion of a communication connection to the network and thus to the other systems of the network. Communication media embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. The network interface device 220 provides one or more network interfaces, and may be represented by network interface cards (NICs).

Depending on the exact configuration and type of the host system 107, 117, memory 210 may be volatile (such as RAM), non-volatile (such as ROM or flash memory) or some combination of the two. In the illustrative embodiment, host system 107, 117 maintains a database or storage facility that is referred to herein as a TARPC 131. TARPC 131 may be internal to memory or other cache of processor 205 or may be a standalone database connected to host system 107, 117. TARPC 131 is designed to be completely secure from network corruption and may be maintained/monitored by a LAN administrator.

While not specifically shown, host system 107, 117 may also include additional hardware devices. For example, host computer 107, 117 may also include additional storage media (removable and/or non-removable) including, but not limited to, magnetic or optical disks or tape. Computer storage media may be volatile and non-volatile, removable and non-removable media, implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by host computer 107, 117. Any such computer storage media may be part of host system 107, 117.

Within host system 107, 117 are software components, of which an operating system (OS) 212 and network application 210 are illustrated. Also illustrated is IP stack and code within NID 220 that enable network communication via IP and ARP. The combination of these and other software components executing in conjunction with the hardware (and firmware) components of host system 107, 117 enable the implementation of an authentication process via the TARPC 131 for ARP responses received by the host system 107, 117 from other devices on the general network 100.

Network 100 completes its device addressing functions via ARP, which enables devices on the network to find a media access control (MAC) address for data communication when the internet protocol (IP) address of the destination device is known. At each host 107, 117 ARP determines a MAC address of a destination host (or gateway) via a broadcast of the IP address of the destination. Collected IP addresses and their corresponding MAC addresses are stored in memory (i.e., an ARP cache) of each host system 107, 117 in a table form and are utilized during packet transmissions. According to the present invention, use of the traditional ARP cache when evaluating ARP responses is replaced by utilization of a network-level TARPC 131.

Figure 3:
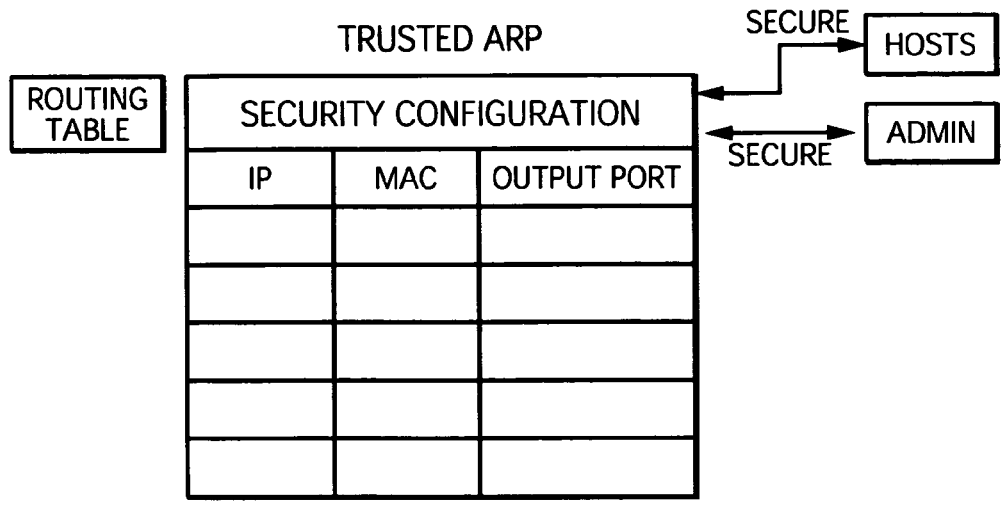
FIG. 3 is a block diagram of an exemplary trusted ARP cache according to one embodiment of the invention.

An exemplary TARPC 131 is illustrated in FIG. 3. As shown, TARPC 131 includes a tabularized format of IP addresses 305 and corresponding MAC addresses 310 with associated output ports 315 for the IP addresses. In addition, TARPC 131 includes a top-level security feature 320 that enables only authenticated access via the host systems 107, 117 and an administrator 325. Utilization of TARPC 131 during ARP response processing at a host is described in detail below with reference to FIG. 4B.

Utilizing the above network configuration, the present invention expands the functionality of individual ARP caches that are susceptible to (man-in-the-middle and other similar types of) attacks by introducing a network-level TARPC and associated expanded ARP response processes that substantially eliminate susceptibility to such attacks and thus provides greater security protection for the network as a whole. The invention places the TARPC at a network level, where each host has access to the TARPC of another host on a different LAN. During the design/configuration/setup of the network, a set of agreements are coded into the respective hosts that triggers the functionality of the invention, as described by FIG. 4A.

Figure 4A:
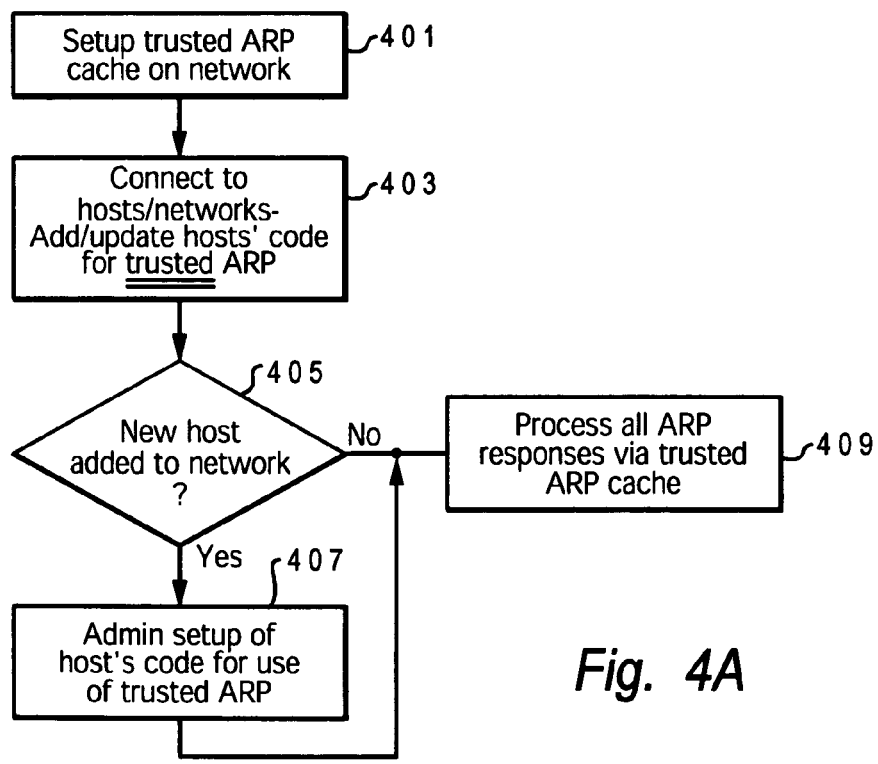
FIG. 4A is flow diagram illustrating LAN registration and administrative setup of hosts and trusted ARP caches to enable the blocking of attempts to poison the ARP cache according to one embodiment of the invention.

FIG. 4A is a flow chart of the process of setting up the ARP response authentication process within a network. First, at block 401 a TARPC is created for the entire LAN and then at block 403, the required ARP response authentication codes utilizing TARPC functionality are added to the address resolution protocol within the host system of the LAN. The LANs are communicatively interconnected (via host systems and/or gateways). Once the host systems are configured an interconnected, all ARP responses are processed according to the process described in FIG. 4B below, as shown in block 405.

Addition of new LANs to the network are monitored (by an administrator or some built in monitoring component), and at block 405 a determination is made whether such an event occurs. Whenever a new LAN (with associated host system) is added to the network, the administrator of that network sets up the host system to utilize the ARP response authentication process, as indicated at block 409. In this way, all LANs (or host systems) are similarly configured with respect to handling ARP responses and no host system is susceptible to being corrupted, since this would in turn corrupt the other host systems in the network.

Figure 4B:
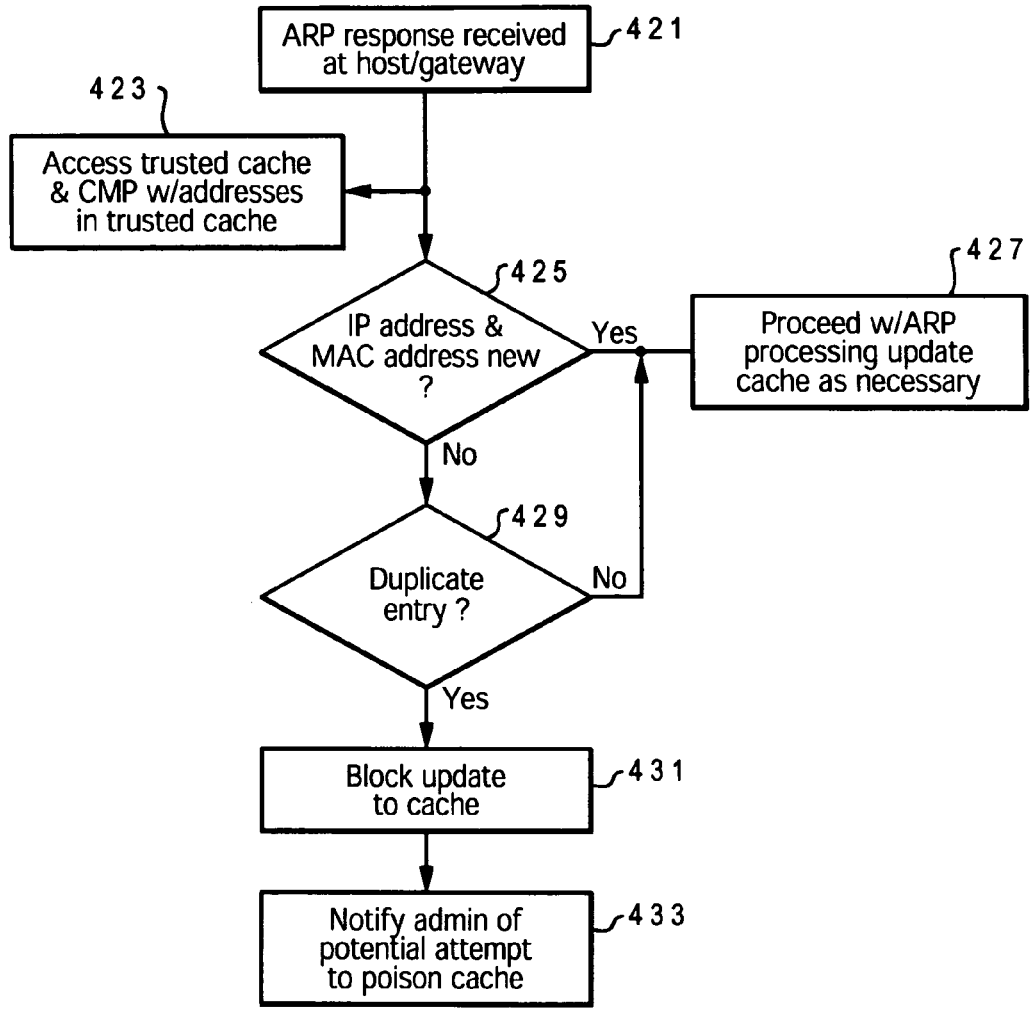
FIG. 4B is a flow chart of the process of monitoring for attempts to poison the ARP cache during standard ARP response processing according to one embodiment of the invention.

Turning now to FIG. 4B, there is illustrated the process by which a received ARP response is processed (i.e., authenticated/validated) by a host system in the network. The process begins at block 421 where an ARP response is received at the host system. The host system accesses the secured TARPC and compares the IP and MAC addresses in the ARP response with those within the TARPC, as indicated at block 423. This comparison may be completed as two separate comparisons by which the IP address is first compared to all IP addresses in the TARPC and then the MAC address is then compared against all MAC addresses in the TARPC. When a match of one of the addresses occurs in this implementation, the associated addresses are then automatically compared to determining whether the pairing already exists in the TAPC.

Returning to the process flow, a determination is made at block 425 whether the IP address and MAC address are new addresses (i.e., not currently existing within the TARPC). When both addresses are new, the hosts proceeds with ARP processing and updates the TARPC with the new IP address and MAC address pairing/combination, as shown at block 427. Since there is no conflict, the trusted ARP caches for the participating networks are updated with the new ARP entry.

When one of either the IP address or MAC address exists within a different pairing in the trusted ARP cache, (i.e., the ARP response contains a duplicate entry of an existing IP address or existing MAC address), a determination is made whether one address within the address pairing is a duplicate entry (i.e., that address already exists in a different pairing within the TARPC). If only one of the addresses is a duplicate entry, then the host immediately blocks an update to the TARPC at block 431, and a notification is sent to alert the administrator of the LAN of potential attempts to poison the ARP cache, as shown at block 433.

Accordingly, by comparing the new ARP response with the contents of the TARPC, any existing conflict is identified and identification of the conflict triggers the transmission of a notification to the system administrator. By implementing the methods of the invention, an unpoisoned ARP cache can be maintained for each participating network (across multiple interconnected LANs, WANs, etc.) and ARP cache poisoning attempts from within the network are detected.

FIG. 1 illustrates a specific exemplary network with gateways handling an ARP response from an attacking client. Three gateways 125 are shown labeled gateway1, gateway2 and gateway3 for simplicity. Each gateway 125 has/maintains an associated TARPC (or TARP table) 130. Gateways 125 are interconnected via a network interconnect 150 (illustrated as a line connection for simplicity). Multiple clients 110 are connected to each gateway (either directly or via a router/host (not shown). One of these clients 107 is depicted as an attacking client 107' (i.e., a client being utilized by a user who wishes to corrupt the ARP caches on the network). Attacking client 107' has a stolen IP address of another legitimate client 107".

Applying the process of FIG. 4B above, gateway1 receives an ARP entry from the attacking client 107' and notices that there is a second, different MAC entry for the IP address within the ARP entry or vice versa (i.e., a second, different IP entry for the MAC address) when compared to the pairing in the local TARPC. Gateway1 thus initiates a query to the TARPCs of gateway2 and/or gateway3. Only one other TARPC is queried in one embodiment, while alternate embodiments may provide a query of more than one other TARPC across the network. The gateway(s) of the queried TARPC(s) responds with a correct entry from the TARPC, which exposes the conflict at gateway1. Gateway1 then responds by flagging the ARP entry and/or alerting the other gateways and the administrator of the attempted attack on the network.

Introduction of discovery features of a newer version of Internet Protocol (IP), i.e., IPv6 Neighbor Discovery requires support for the protocol (IPv6). This may not be available or may not be an easy task to migrate to in all existing networks. The present invention, however, provides a new approach to adding a measure of security to the current ARP protocol, which approach fits more easily within current IPv4 networks and does not require migration to IPv6. The invention is novel in that the method/algorithm for updating a secure ARP cache automatically is provided without compromising the trusted network. The published ARP entries require manual updates by the administrator.

Implementation of the invention leads to extreme efficiency compared to other solutions because validation of the ARP responses only occur when needed and a single host protects an entire LAN. Also, utilization of the single host greatly reduces the duplication of effort in maintenance and protection of the network.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A network implementing address resolution protocol (ARP), said network comprising:
   a first device that operates as a first gateway for a first sub-network that has at least one first network client device, said first device having an associated first trusted ARP cache (TARPC) that maintains correct mapping of an IP address to a respective MAC address of each of the at least one first network client device;
   a second device that operates as a second gateway for a second sub-network connected to the first sub-network, said second sub-network also having at least one second network client device, said first device having an associated second TARPC that also maintains correct mapping of an IP address to a respective MAC address of each of the at least one second network client device; and
   logic associated with ARP functionality of said first device for authenticating an ARP response received by said first device, wherein when said ARP response contains a different MAC address to IP address pairing from a pairing contained in the TAPRC of either said MAC address or said IP address, said TARPC is not updated to reflect the address mapping within the ARP response, wherein said logic for authenticating a received ARP response includes:
      first logic for comparing said MAC address with all MAC addresses within the first TARPC of the first device;
      second logic for comparing said IP address with all IP addresses within the first TARPC of the first device;
      third logic that forwards the addresses of the ARP response to the second device for completing a comparison within the second TARPC when said second logic for comparing at said first TARPC provides a match of one of said MAC address or said IP address; and
      fourth logic for updating the first TARPC with the MAC address and IP address pairing of the ARP response when said comparing at said first TARPC does not yield a match of either said MAC address or said IP address;
      wherein when both the MAC address and the IP address pairing of the ARP response matches a pairing of MAC address and IP address at the first device, the ARP response is authenticated.

2. The network of claim 1, further comprising logic within said first device for messaging the duplication of the particular address to a pre-identified output device of an administrator.

3. The network of claim 1, wherein said first device and said second device are gateways.

4. The network of claim 1, wherein said first and said second sub-networks are local area networks (LANs) and said first and second devices are servers of respective ones of said LANs.

5. In an ARP-configured network having two sub-networks with respective first trusted ARP cache (TARPC) and second TARPC, each sub-network connected together by a first gateway of a first sub-network and a second gateway of a second sub-network, a method for authenticating addresses within an ARP response, said method comprising:
   receiving said ARP response at said first gateway;
   parsing said ARP response for the IP address and the associated MAC address;
   comparing an IP address and an associated MAC address within the ARP response to respective IP addresses and MAC addresses within the first TARPC;
   when only one of the IP address or the MAC address is duplicated within address pairings of the first TARPC, forwarding the IP address and the MAC address to the second gateway for authentication within the second TARPC;

blocking authentication of the ARP response when the second TARPC also finds a duplication of only one of the IP address and MAC address within the address pairings in the second TARPC; and updating the first TARPC with the IP address and MAC address pairing of the ARP response when neither the IP address nor the MAC address matches an address within the first TARPC;

wherein when both the MAC address and the IP address pairing of the ARP response matches a pairing of MAC address and IP address at the first device, the ARP response is authenticated.

6. A system comprising:

means for establishing a trusted address resolution protocol (ARP) cache (TARPC) for each gateway of a network having at least two sub-networks;

encoding means within an ARP of each gateway an authentication process for received ARP responses that enables each gateway to verify by referencing the TARPC that a received ARP response is a legitimate response on the network and not a potential attack on the network;

logic for receiving said ARP response at said first gateway;

logic for comparing an IP address and associated MAC address within the ARP response to respective IP addresses and MAC address within the first TARPC;

logic for forwarding the IP address and the MAC address to a second gateway for authentication within a second TARPC when only one of the IP address and the MAC address matches an address of an address pairing within the first TARPC; and logic for updating the first TARPC with the IP address and MC address pairing when neither the IP address nor the MAC address matches an address within the first TARPC;

wherein when both the MAC address and the IP address pairing of the ARP response matches a pairing of MAC address and IP address at the first device, the ARP response is authenticated.

7. A method comprising:

establishing a trusted address resolution protocol (ARP) cache (TARPC) for each gateway of a network that includes at least two sub-networks;

encoding within an ARP of each gateway an authentication process for received ARP responses, wherein the authentication process enables each gateway to verify by referencing the TARPC that a received ARP response is a legitimate response on the network and not a potential attack on the network, wherein said authentication process includes:

receiving said ARP response at said first gateway;

parsing said ARP response for the IP address and an associated MAC address;

comparing an IP address and associated MAC address within the ARP response to respective addresses within the first TARPC;

when only one of the IP address and the MAC address matches an address pairing within the first TARPC, forwarding the IP address and the MAC address to a second gateway for authentication within a second TARPC;

blocking authentication of the ARP response when the second TARPC also finds a duplication of only one of the IP address and MAC address within the address pairings in the second TARPC; and updating the first TARPC with the IP address and MC address pair when neither the IP address nor the MAC address matches an address within the first TARPC;

wherein when both the MAC address and the IP address pairing of the ARP response matches a pairing of MAC address and IP address at the first device, the ARP response is authenticated.

* * * * *